(12) United States Patent
Newman et al.

(10) Patent No.: US 9,106,574 B2
(45) Date of Patent: Aug. 11, 2015

(54) SUPPORTING QUALITY OF SERVICE DIFFERENTIATION USING A SINGLE SHARED BUFFER

(71) Applicants: Peter Newman, Fremont, CA (US); Francis Matus, Saratoga, CA (US); Georges Akis, Los Altos, CA (US); Ganlin Wu, Palo Alto, CA (US)

(72) Inventors: Peter Newman, Fremont, CA (US); Francis Matus, Saratoga, CA (US); Georges Akis, Los Altos, CA (US); Ganlin Wu, Palo Alto, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 52 days.

(21) Appl. No.: 13/728,866

(22) Filed: Dec. 27, 2012

(65) Prior Publication Data

US 2014/0185442 A1    Jul. 3, 2014

(51) Int. Cl.
| | | |
|---|---|---|
| *H04J 1/16* | (2006.01) | |
| *H04J 3/14* | (2006.01) | |
| *H04L 1/00* | (2006.01) | |
| *H04L 12/26* | (2006.01) | |
| *H04L 12/835* | (2013.01) | |
| *H04L 12/861* | (2013.01) | |
| *H04L 12/869* | (2013.01) | |
| *H04W 28/02* | (2009.01) | |
| *H04L 12/851* | (2013.01) | |
| *H04L 12/879* | (2013.01) | |
| *H04L 12/863* | (2013.01) | |

(52) U.S. Cl.
CPC .............. *H04L 47/30* (2013.01); *H04L 47/60* (2013.01); *H04L 47/6215* (2013.01); *H04L 49/9036* (2013.01); *H04L 47/24* (2013.01); *H04L 47/623* (2013.01); *H04L 49/901* (2013.01); *H04W 28/02* (2013.01)

(58) Field of Classification Search
None
See application file for complete search history.

(56) References Cited

U.S. PATENT DOCUMENTS

| | | | |
|---|---|---|---|
| 4,965,788 A | 10/1990 | Newman | |
| 6,463,484 B1 * | 10/2002 | Moss | 710/36 |
| 6,763,394 B2 | 7/2004 | Tuck, III et al. | |
| 7,826,469 B1 | 11/2010 | Li et al. | |
| 8,588,241 B1 | 11/2013 | Li et al. | |
| 2007/0070895 A1 * | 3/2007 | Narvaez | 370/230 |
| 2008/0212472 A1 * | 9/2008 | Musacchio et al. | 370/232 |
| 2010/0332698 A1 * | 12/2010 | Muller | 710/57 |

FOREIGN PATENT DOCUMENTS

| | | |
|---|---|---|
| WO | WO2011/085934 | 7/2011 |
| WO | WO2014/105287 | 7/2014 |

OTHER PUBLICATIONS

PCT Jun. 30, 2014 International Search Report and Written Opinion of the International Searching Authority from International Application No. PCT/US2013/070529.
Peter Newman, "A Fast Packet Switch for the Integrated Services Backbone Network," IEEE J. Selected Areas in Commun., 6 (9), Dec. 1988; 12 pages.

* cited by examiner

*Primary Examiner* — Kodzovi Acolatse
(74) *Attorney, Agent, or Firm* — Patent Capital Group

(57) ABSTRACT

An example method, system, and switching element are provided and may provide for an egress port to be configured to receive a plurality of data packets, each of the plurality of data packets being a class of a plurality of classes. A buffer may communicate with the at least one data port interface. A memory management unit may be configured to enable and disable transmission of the plurality of classes of the plurality of data packets based on a metering policy; and place the plurality of data packets in the buffer.

20 Claims, 6 Drawing Sheets

SUPPORTING QUALITY OF SERVICE DIFFERENTIATION USING A SINGLE SHARED BUFFER

TECHNICAL FIELD

This disclosure relates in general to the field of network communications and, more particularly, to managing different classes of service in a single shared buffer.

BACKGROUND

Congestion can involve too much network traffic clogging network pathways. Common causes of congestion may include too many users on a single network segment or collision domain, high-demand from bandwidth-intensive networked applications, a rapidly growing number of users accessing the Internet, and the increased power of personal computers (PCs) and servers, etc. Data networks frequently attempt to offer different classes of service to different types of traffic. For example, voice traffic prefers low jitter, control traffic prefers low latency, and best effort traffic gets whatever bandwidth remains. A typical means to offer this differentiation of service is to give each class of traffic a separate queue and to schedule traffic from each queue out of an egress port according to some policy. This policy frequently assigns a percentage of the egress link bandwidth to each class to be applied under overload conditions. One potential difficulty in reaching high-speed operation occurs when packets exit the network device. Packets queued up on an egress port of a network device need to be shaped and scheduled for transmission. This shaping is typically performed on a per class of service (CoS) basis.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
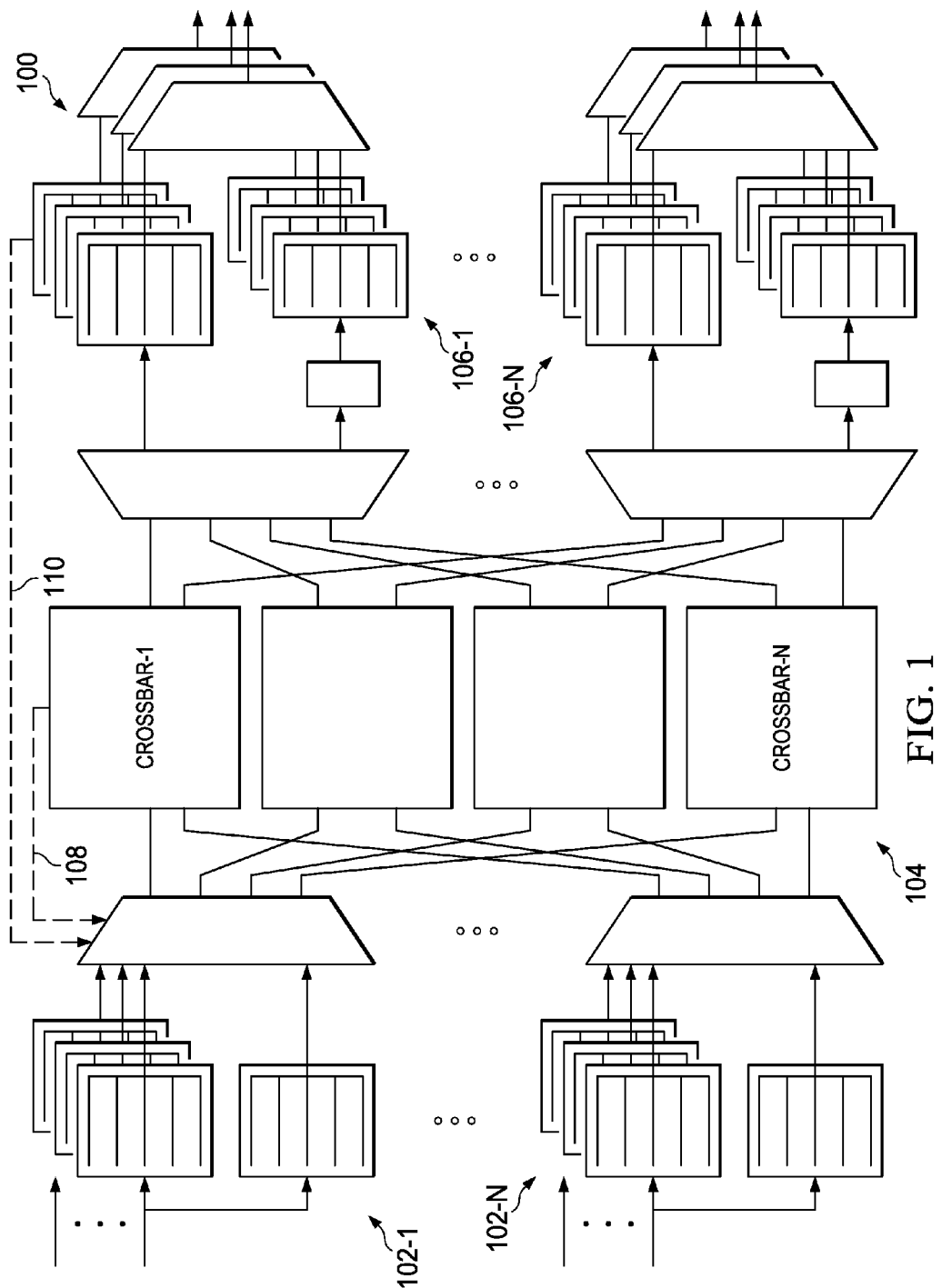
FIG. 1 is an example illustration of a switching element in accordance with an embodiment.

FIG. 1 is a simplified illustration of a switching element 100 in accordance with an embodiment. Switching element 100 includes N ingress ports 102-1 . . . 102-N, connected to crossbar 104. Crossbar 104 in turn connects each of ingress ports 102-1 . . . 102-N to the P egress ports 106-1 . . . 106-P, where P may equal N. In this embodiment, N and P equal 48, however, N and P may equal any other number in other embodiments. Crossbar 104 may include an acknowledge feedback loop 108. Additionally, each egress port may include an Xon/Xoff broadcast loop 110.

A switching element may have more than one ingress port and more than one egress port. The ports are often organized so each specific port functions for both ingress and egress. For descriptive purposes, however, it is useful to treat ingress and egress ports as separate entities, because they are logically separate and are often implemented as separate entities. A packet received at any ingress port is pre-processed at that port by, for example, checking the header information for type, source and destination, port numbers, and so forth, and determining which of potentially many rules and processes apply, and then processing the packet by applying the determined procedures. Some packets may be data packets for such as a video stream or a Web page, for example, which may be processed by re-transmitting them at whatever egress port is determined to be coupled to the next node to which they should go on the way to the final destination. Other packets may be determined to be queries from a neighboring router, which may be diverted to a central processing unit (CPU) for a subsequent answer to be prepared and sent back to the neighbor.

Figure 2:
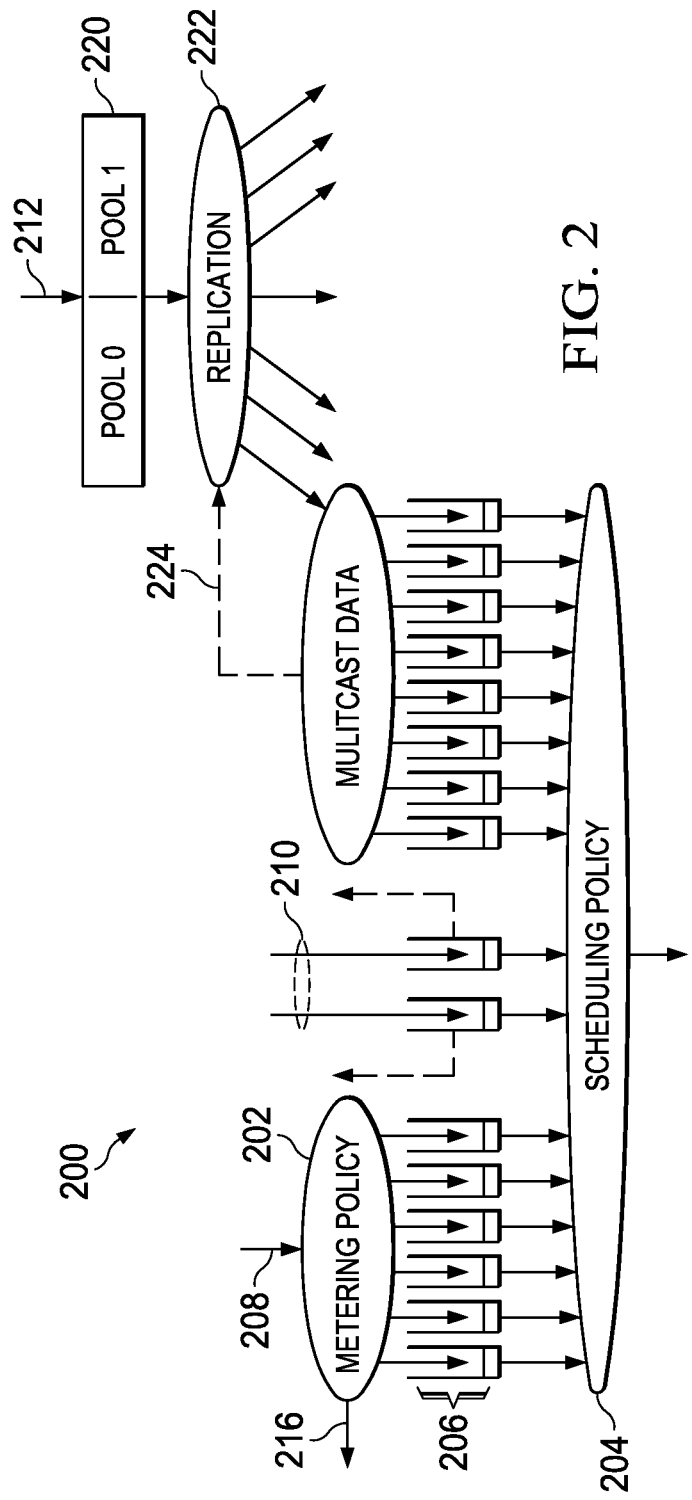
FIG. 2 is an example illustration of an egress port in accordance with an embodiment.

FIG. 2 is a simplified illustration of an egress port 200 in accordance with an embodiment. Egress port 200 may be an example of any one of egress ports 106-1 . . . 106-P as shown in FIG. 1. Egress port 200 may include a metering policy 202, a scheduling policy 204, and queues 206. In an illustrative embodiment, egress port 200 may receive data packets from a crossbar. Data packets may be unicast droppable traffic 208, unicast non-droppable traffic 210, multicast traffic 212, and/or some other type of data traffic. Additionally, data packets may be different classes of service (CoS).

Unicast traffic 208 and 210 is sent from a single source to a single destination. There is one device transmitting a message destined for one receiver. The difference between unicast droppable traffic 208 and unicast non-droppable traffic 210 is that unicast non-droppable traffic 210 is considered undesirable to be dropped. Multicast traffic 212 enables a single device to communicate with a plurality of destinations. For example, this allows for communication that resembles a conference call. Anyone from anywhere can join the conference, and everyone at the conference hears what the speaker has to say. The speaker's message isn't broadcasted everywhere, but only to those in the conference call itself.

In one or more embodiments, and in particular with respect to unicast droppable traffic 208, data packets may be managed by metering policy 202 before entering a buffer (not shown). The buffer may be shared by unicast droppable traffic 208, unicast non-droppable traffic 210, and multicast traffic 212. Metering policy 202 may be a strict policy, weighted round robin, deficit weighted round robin (DWRR), accounting policy, counting policy, a combination of policies, and/or some other type of metering policy. The different CoS may be of different desirability to be allowed through egress port 200. In an example, a voice connection may require more data packet bandwidth than another type of class. In this example, metering policy 202 may have the CoS for the voice connection as a higher priority than another CoS.

Additionally, with regard to unicast droppable traffic 208, Xon/Xoff signals 216 may be sent to an ingress port. Xon/Xoff signals 216 may be capable of enabling and disabling access to egress port 200 on a per class basis by indicating to an ingress port to begin buffering unicast droppable traffic 208 on an ingress side of a switching element. Xon/Xoff signals 216 may use, for example, Xon/Xoff broadcast loop 110 as shown in FIG. 1.

Metering policy 202 and Xon/Xoff signals 216 may be used together to manage the flow of different classes of unicast droppable traffic. For example, if there are classes A, B, and C, with A having twice the weighting (when using weights in metering policy 202) as B and C. As traffic enters egress port 200, metering policy 202 may keep track of how many packets of data has entered the buffer (not shown). In this example, A is allowed 100 units; with B and C each allowed 50 units. A unit may be one packet of data or any other type of method of separation data on a network. Metering policy 200 may count the packets as they come through to the buffer. When any of the classes begin to reach their allotment, Xon/Xoff signals 216 may be sent to the ingress port to begin buffering those classes. Xon/Xoff signals 216 may be sent when the allotment is reached (or ahead of time, taking into account a delay of Xon/Xoff signals 216).

Additionally, as unicast droppable traffic 208, unicast non-droppable traffic 210, and multicast traffic 212 enter the buffer, pointers (not shown) to addresses (not shown) for the locations of each data packet in the buffer are entered into queues 206 (also referred to as lists). The pointers may be placed into a queue corresponding to a CoS of the data packet to which the pointer points to the address. Scheduling policy 204 may express a desired service ratio between the traffic classes in which unicast droppable traffic 208, unicast non-droppable traffic 210, and multicast traffic 212 may be fetched from the buffer. Scheduling policy 204 may use a similar type of weighting system as metering policy 202. In this manner, it is desirable for data packets to be fetched from the buffer in the same or substantially the same ratio in which they are placed into the buffer, ensuring that the buffer does not get full. Multicast traffic 212 may first enter a multicast buffer 220, and then enter a multicast replication stage 222. During the multicast replication stage 222, the multicast traffic is replicated to other egress ports. Multicast traffic 212 may also be subject to a pruning threshold 224.

In operational terms, and in a particular embodiment, egress ports of a switching element (also referred to as a multi-stage switch fabric) may be implemented as a shared memory switch. This is where queues (also referred to as egress queues) and a memory management unit (also referred to as egress scheduler) may be located. However, unicast traffic may be buffered in queues at the ingress port with a simple Xon/Xoff control signals connecting queues 206 to ingress queues. The switching element can deliver a very high amount of traffic to a single shared memory stage simultaneously. With a delay imposed by a Xon/Xoff broadcast loop 110, a substantial amount of buffer may need to be dedicated to catch packets in flight once an Xoff signal has been issued. If each class of unicast droppable traffic 208 were implemented as a separate buffer, each class would need to dedicate a very large amount of buffer to in-flight absorption because unicast packets in flight can belong to any traffic class. One or more of the illustrative embodiments may support eight or more unicast traffic classes. One or more embodiments provides a scheme in which unicast traffic classes share a single buffer and yet class of service differentiation can still be applied by scheduling policy 204

On egress port of the switching element, separate queues (linked lists) of packets are implemented as usual, one queue per class of unicast traffic. The queues may be served by a deficit weighted round robin (DWRR) scheduler that selects packets from the queues for transmission out of the egress port. However, in this embodiment, the unicast packets are stored in a single shared buffer memory without any per-class boundaries.

One or more embodiments of this disclosure recognize and take into account that with a single shared buffer, a single class of traffic arriving in excess of the drain rate programmed by the DWRR can consume the entire buffer and exclude traffic from other classes. This invalidates the service guarantees for other traffic classes. In accordance with the teachings of the present disclosure, the system can maintain service guarantees by controlling access to the buffer using a second, modified, deficit weighted round robin algorithm in a metering policy, which issues per-class Xon, and Xoff signals.

A deficit weighted round robin accounting algorithm maintains a traffic class profile vector for unicast packets entering the buffer. Classes are given credit according to their programmed weights. When a packet arrives on a class, credit on that class is decremented according to the size of the packet. When the credit for a class is exhausted that class is marked out-of-profile. When classes with packets in the shared buffer are out-of-profile, the credit is refreshed by incrementing the credit for each class by its programmed weight. There is an upper limit for the maximum amount of credit any class can hold. The refresh operation may need to be repeated until at least one traffic class with packets in the queue has credit. Traffic classes with credit are marked as being in-profile.

Figure 3:
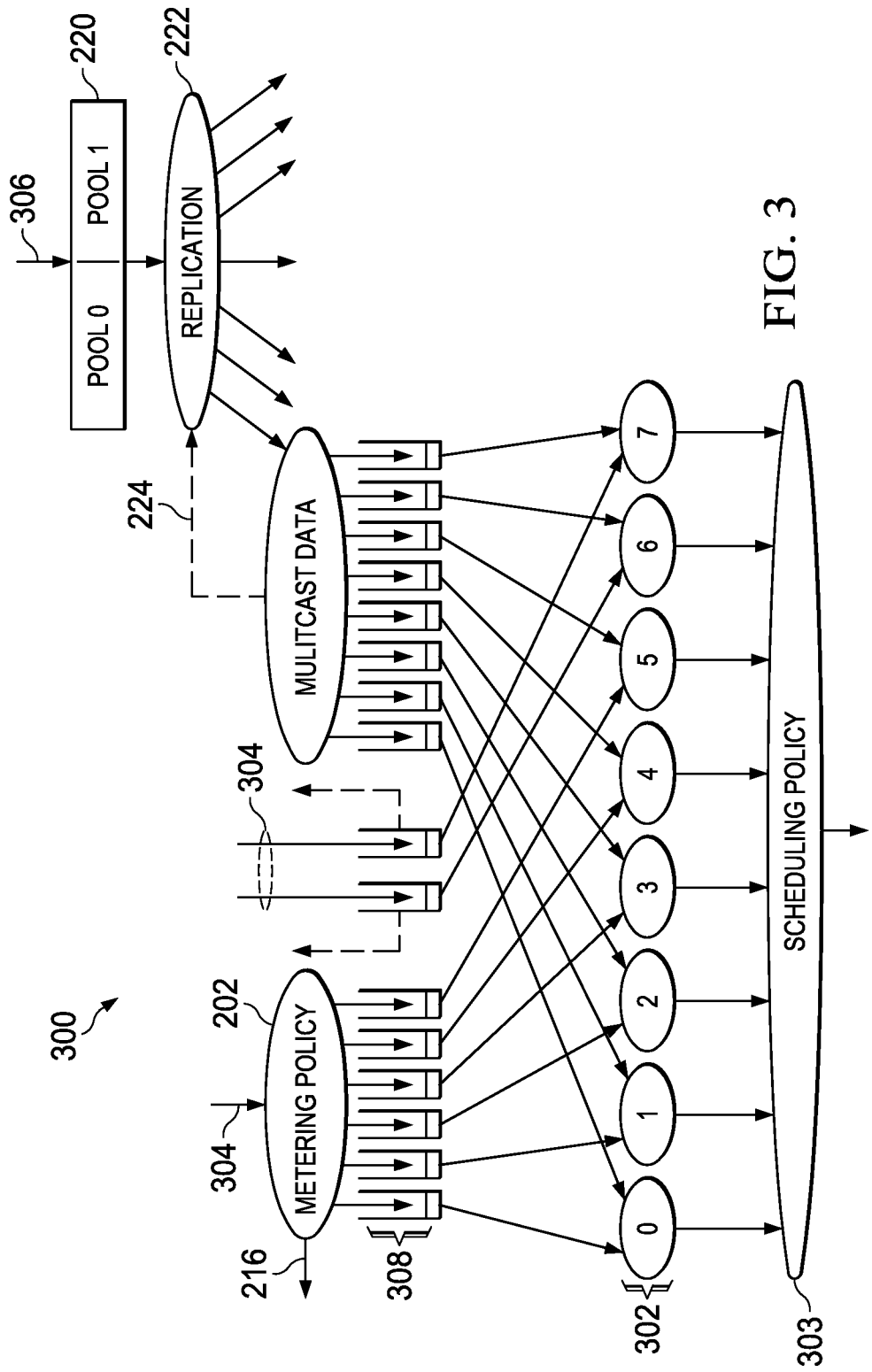
FIG. 3 is a simplified illustration of an egress port with a two level scheduling policy in accordance with an embodiment.

FIG. 3 is a simplified illustration of an egress port 300 with a two level scheduling policy in accordance with an embodiment. Egress port 300 is similar to egress port 200 as shown in FIG. 2, except egress port 300 includes two levels of after queue scheduling. In an illustrative embodiment, scheduling policy 302 selects between unicast traffic 304 with multicast traffic 306 on a per class basis. Scheduling policy 303 selects between the CoS of traffic. For example, scheduling policy 303 may select to fetch data packets of class 4 while scheduling policy 302 selects to fetch unicast traffic 304 within that class.

In operational terms, in a particular one embodiment, it is desirable to use two scheduling policies (also referred to as a two-level DWRR algorithm) to drain queues 308. Scheduling policy 302 schedules unicast traffic 304 and multicast traffic 306 separately within each traffic class. Scheduling policy 303 schedules each combined traffic class. Both type of traffic have a credit limit greater than the highest assigned weight to allow for unicast classes that temporarily have no packets in the shared buffer.

To support two scheduling policies, a metering policy 310 that is used to fill the shared buffer may need to be modified. The weights used by metering policy 310 may be the same or substantially similar to those used by scheduling policy 303 to drain the combined unicast/multicast classes. Thus, the DWRR credit per class applies to the combined unicast and multicast traffic in each class. Therefore, the system should also account for multicast traffic 306. When a multicast packet is dequeued for transmission, credit in metering policy 310 for that class may be decremented according to the size of the packet. However, in the absence of unicast traffic 304 on the class, this could lead to the credit for the class being reduced to the maximum negative level, which could disable unicast traffic 304 on that class until the multicast load is withdrawn. Therefore, to prevent this unicast lockout, credit is only decremented for a multicast departure if there are unicast packets of that class stored in the buffer.

Figure 4:
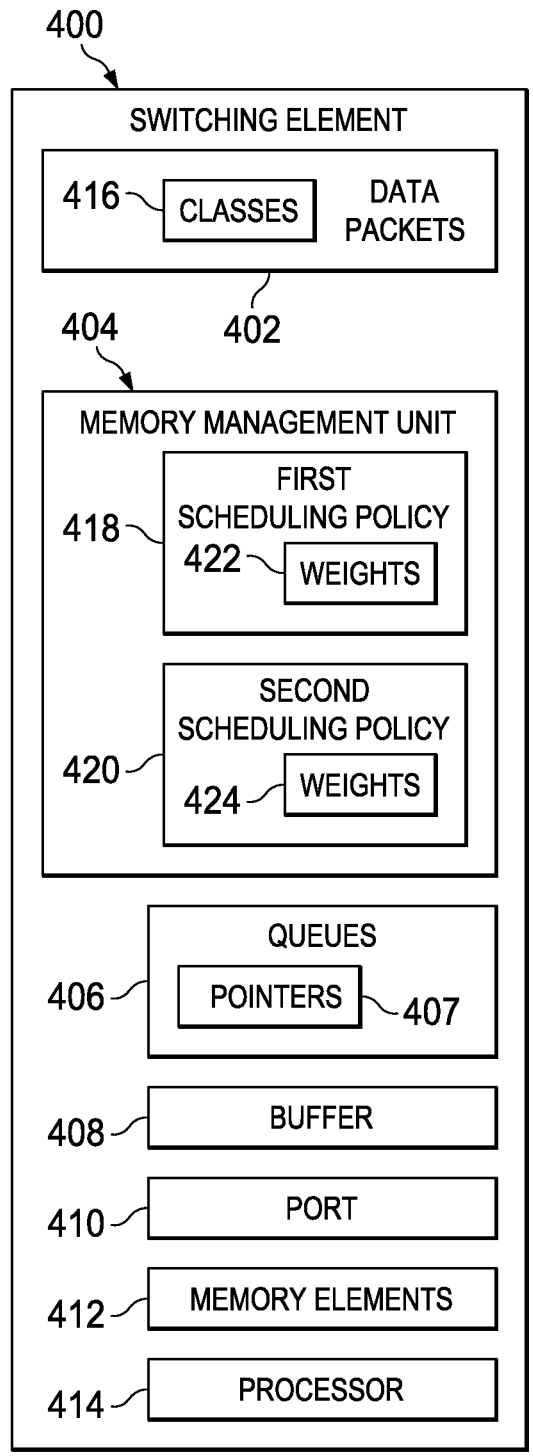
FIG. 4 is an example block diagram of a switching element in accordance with an embodiment.

FIG. 4 is a simplified block diagram of a switching element 400 in accordance with an embodiment. Switching element 400 may be one implementation of switching element 100 as shown in FIG. 1. Switching element 400 may include data packets 402, memory management unit 404, queues 406, shared memory buffer 408, port 410, memory elements 412, and processor 414.

Data packets 402 may be any type of data, such as, for example, video traffic, voice traffic, control traffic, or some other type of traffic. Data packets 402 may be any number of packets and packet size. Data packets 402 may include classes 416. Classes 416 may designate the type of content, service plan, membership, formatting, or simply characterize the type of data such as voice, video, media, text, control, signaling, etc. A number of classes may include one or more of these items.

Memory management unit (MMU) 404 may be a logic unit configured to control and manage data packets 404 through queues 406, buffer 408, and port 410. MMU 404 may be implemented as a software logic unit and/or a hardware logic unit. MMU 404 may include different scheduling policies. For example, MMU 404 may include metering policy 418 and scheduling policy 420. In one or more embodiments, metering policy 418 and scheduling policy 420 may utilize a substantially similar weighting method for classes 416. Metering policy 418 and scheduling policy 420 each contain weights 422 and 424, respectively. Weights 422 and 424 may be different weighting units used to weight classes 416 for determining transfer rates to and from buffer 408. In one or more embodiments, MMU 404 may also include a second scheduling policy, such as in the example illustrated in FIG. 3.

Queues 406 may be queues for different classes 416 of data packets 402. Each class may have a queue. Queues 406 may include pointers 407 that point to an address for each data packet of data packets 402. Pointers 407 may be placed into queues 406 in the order data packets 402 are received according to class. Buffer 408 may be a shared memory location for buffering data packets 402 before being sent to port 410. Buffer 408 may or may not be implemented as part of memory elements 412. Port 410 may be an egress port. Port 410 may be an exit point for data packets 402 within switching element 400.

In regards to the internal structure associated with switching element 400, memory elements 412 may be used for storing information to be used in the operations outlined herein. Each of MMU 404 may keep information in any suitable memory element (e.g., random access memory (RAM) application specific integrated circuit (ASIC), etc.), software, hardware, or in any other suitable component, device, element, or object where appropriate and based on particular needs. Any of the memory items discussed herein (e.g., memory elements 412) should be construed as being encompassed within the broad term 'memory element.' The information being used, tracked, sent, or received by MMU 404 could be provided in any database, register, queue, table, cache, control list, or other storage structure, all of which can be referenced at any suitable timeframe. Any such storage options may be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, MMU 404 may include software modules (e.g., scheduling policies 418 and 420) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, MMU 404 may include a processor 414 that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 5:
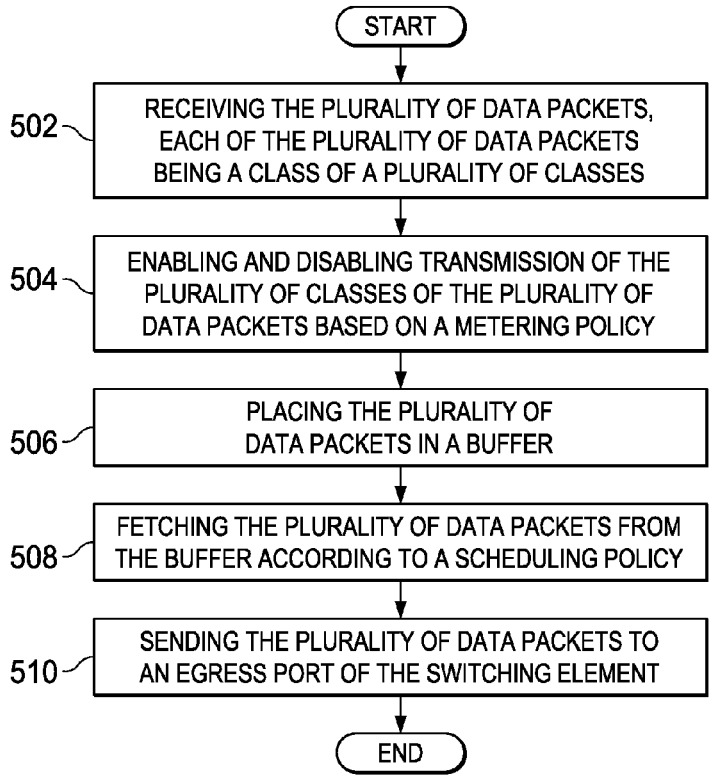
FIG. 5 is a simplified flowchart illustrating a method for managing a plurality of data packets in a switching element in accordance with an embodiment.

FIG. 5 is a simplified flowchart illustrating a method for managing a plurality of data packets in a switching element in accordance with an embodiment. The flow may begin at 502, when an egress port receives the plurality of data packets. Each data packet of the plurality of data packets may be a data class of a plurality of data classes. At 504, the memory management unit may enable and disable transmission of the plurality of classes of the plurality of data packets based on a metering policy. The memory management unit may send signals to an ingress port indicating to either buffer or not buffer different classes of data. The metering policy, used by the memory management unit, determines which classes are to be buffered or not buffered on the ingress port. The metering policy may use a plurality of weights associated with the plurality of classes. Additionally, the plurality of weights may be based on a deficit weighted round robin system. Furthermore, a maximum credit used for the plurality of classes in the deficit weighted round robin system may be larger than the largest weight of the plurality of weights.

At 506, the plurality of data packets is placed into a buffer. In one or more embodiments, the plurality of data packets is unicast droppable traffic. Additionally, in one or embodiments, the buffer is also shared with unicast non-droppable traffic and multicast traffic. At 508, the memory management unit may fetch the plurality of data packets from the buffer according to a scheduling policy. The scheduling policy may have a plurality of weights associated with the plurality of data classes. The plurality of weights may be based on a deficit weighted round robin system. A maximum credit for the plurality of classes may be larger than a largest weight of the plurality of weights. At 510, the memory management unit may send the plurality of data packets to an egress port of the switching element. Even though many of the elements mentioned above are located in the egress port, at 510 the plurality of data packets may be sent to the exit of the egress port.

Figure 6:
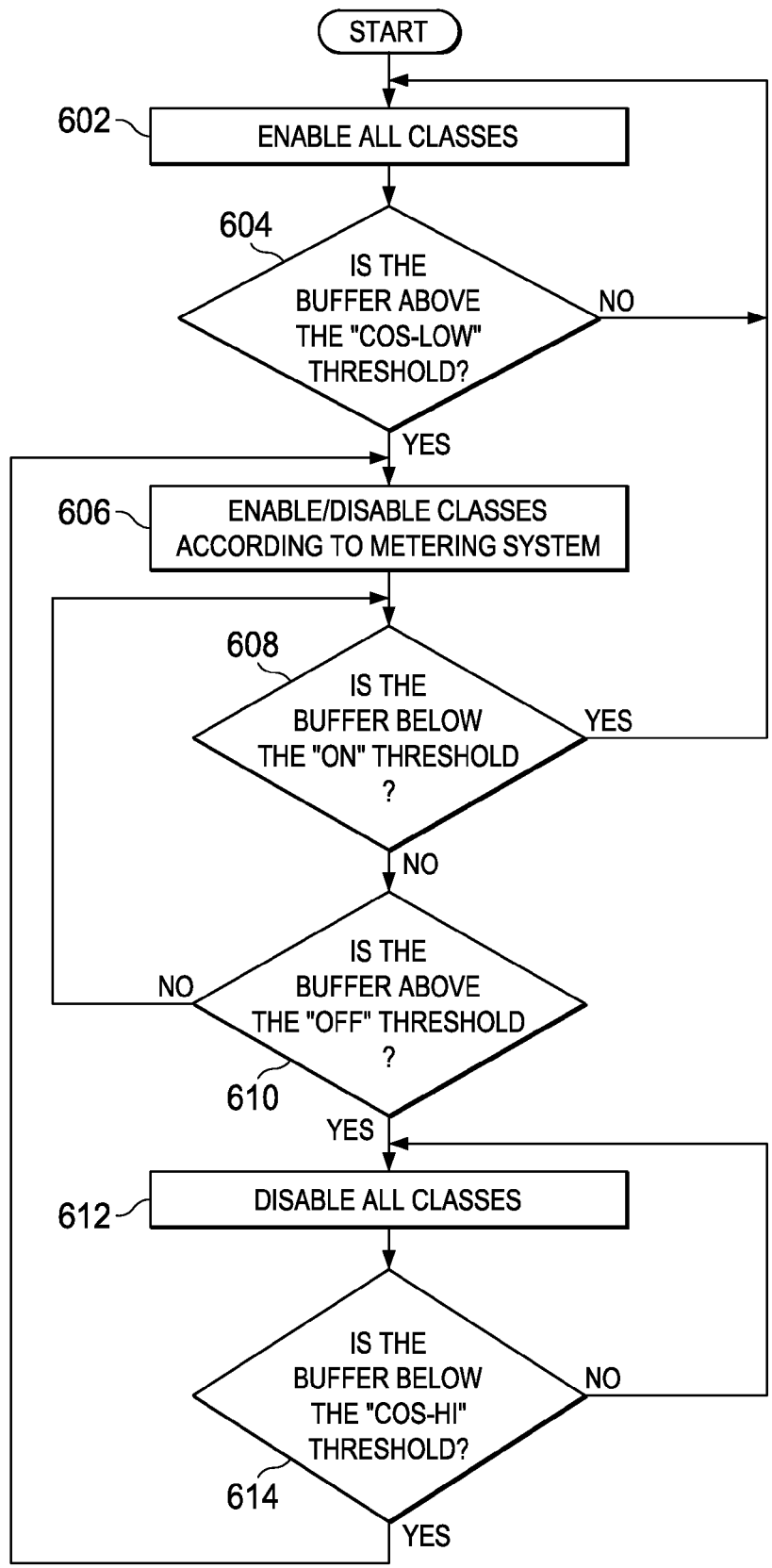
FIG. 6 is a simplified flowchart illustrating a method for managing a buffer in accordance with an embodiment.

FIG. 6 is a simplified flowchart illustrating a method for managing a buffer in accordance with an embodiment. The flow may begin at 602, when the memory management unit enables the classes. Each data packet of the plurality of data packets may be a data class of a plurality of data classes. When the classes are enabled, the buffer receives data packets from the classes. At 604, the memory management unit determines whether the buffer is above the COS-LOW threshold. If the threshold is not crossed, the classes stay enabled. In other words, the classes stay enabled until the COS-LOW threshold is crossed. If the threshold is crossed, at 606, the memory management unit enables/disables the classes according to a metering system. The memory management unit may send a signal to a number of ingress ports. The signal may indicate to the number of ingress ports to enable or disable a class of service until notified otherwise.

At 608, the memory management unit determines whether the buffer is below the ON threshold. If the buffer is below the ON threshold, then the classes are enabled at 602. IF the buffer is not below the threshold, then at 610, the memory management unit determines whether the buffer is above the OFF threshold. If the buffer is not above the OFF threshold, the flow reverts back to 608. If the buffer is above the threshold, at 612, the memory management unit disables the classes.

The, at 614, the memory management unit determines if the buffer is below the COS-HI threshold. If the buffer is not below the threshold then the classes stay disabled at 612. If the buffer is below the threshold, then the memory management unit enables the classes according to the weighting system. The weighting system may be a scheduling policy such as those described herein.

In operational terms, in a particular one embodiment, the shared buffer has four thresholds: OFF, COS-HI, ON, and COS-LOW. These thresholds may also be referred to as Xoff+, Xoff−, Xon+, and Xon−, respectively. The shared buffer can be in one of three states: xOffState, xCosState and xOnState. In xOffState, the traffic classes are disabled. In xCosState traffic, classes are enabled if they are in-profile and disabled if they are out-of-profile. In xOnState, the traffic classes are enabled. A traffic class may be disabled by sending an Xoff signal and enabled by sending an Xon signal for that class. It may be assumed that after a reasonable time delay, the sending of a signal stops or restarts traffic on the indicated traffic class.

An empty buffer begins in the xOnState with the traffic classes enabled. When the occupancy of the buffer crosses the COS-LOW threshold, it enters the xCosState and Xoff signals are sent for any out-of-profile classes. Should the buffer occupancy cross the OFF threshold, the buffer enters the xOffState and Xoff signals are sent for those classes currently in-profile. When the buffer occupancy falls below the COS-HI threshold the buffer enters the xCosState and Xon signals are sent for those classes currently in-profile. Should the buffer occupancy fall below the ON threshold, the buffer enters the xOnState and Xon signals are sent for those classes currently out-of-profile. Also, on the transition from xCosState to xOnState, the credit in the deficit weighted round robin accounting algorithm is refreshed until the traffic classes have credit regardless of whether they have traffic in the buffer or not.

Under saturation, the buffer occupancy oscillates between the OFF threshold and the COS-HI threshold. As the buffer occupancy rises, access to the buffer is controlled per traffic class by the deficit weighted round robin accounting algorithm, which issues per class Xon/Xoff signals. As the buffer occupancy falls, access is disabled for the classes until the COS-HI threshold is crossed.

There may be two deficit weighted round robin accounting algorithms operating in this embodiment. One, operating in the metering policy, controls arrivals to the shared buffer and one, operating in the scheduling policy, controls departures from the shared buffer. The per-class weights in both policies, however, may need to be identical or substantially similar. The metering policy that controls arrivals is described above and differs from the currently used DWRR algorithms in the industry. The scheduling policy that controls departures is also different than the typical algorithms used in the industry.

The typical DWRR algorithms used in the industry assume that if there are no packets of a given class in the queue then that class is inactive and its allocated bandwidth is shared among the classes that do have packets in the queue. Because of the delay implicit in the control loop, the architecture cannot be certain that the active classes will always have packets in the queue. To cope with this, the system can raise the maximum credit that the classes can accumulate. Normally, in the DWRR algorithm, the maximum credit a class can accumulate is the same as its assigned weight. This limit is raised to be greater than the highest of the assigned weights, and possibly several times this value. This allows a traffic class to accumulate some credit if it temporarily has no traffic in the queue and consume its accumulated credit when traffic arrives.

Figure 7:
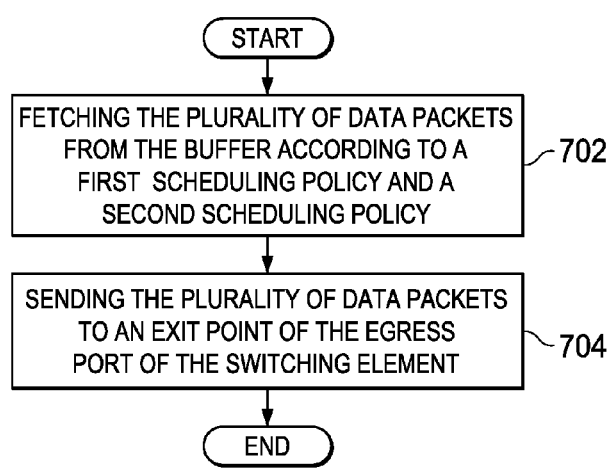
FIG. 7 is a simplified flowchart illustrating a method with a two level scheduling policy for draining a queue in accordance with an embodiment.

FIG. 7 is a simplified flowchart illustrating a method with a two level scheduling policy for draining a queue in accordance with an embodiment. The flow may begin at 702, when the memory management unit fetches the plurality of data packets from a buffer according to a first scheduling policy and a second scheduling policy. Each data packet of the plurality of data packets may be a data class of a plurality of data classes. The first scheduling policy selects between unicast traffic and multicast traffic and the second scheduling policy selects between the pluralities of classes.

The memory management unit may mix the unicast traffic with the multicast traffic according to class to form mixed lists. In other words, unicast traffic and multicast traffic of the same class are grouped together. The mixed lists may be grouped by class. Additionally, the memory management unit may fetch the plurality of data packets from the buffer according to a second scheduling policy. The first and scheduling policies may have a plurality of weights associated with the plurality of data classes. The plurality of weights is based on a deficit weighted round robin system. A maximum credit for the plurality of data classes may be larger than a largest weight of the plurality of weights. The weights in the first scheduling policy may differ from the second scheduling policy.

At 704, the memory management unit may send the plurality of data packets to an exit point of the egress port of the switching element. Even though many of the elements mentioned above are located in the egress port, at 708 the plurality of data packets may be sent to the exit of the egress port.

Note that in certain example implementations, the managing of data packets as outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA]) or an ASIC that includes digital logic, software, code, electronic instructions, or any suitable combination thereof.

As used herein in this Specification, the term "switching element" is meant to encompass any type of infrastructure including switches, cloud architectural components, virtual equipment, routers, transceivers, cable systems, gateways, bridges, loadbalancers, firewalls, inline service nodes, proxies, servers, processors, modules, or any other suitable device, component, element, proprietary appliance, or object operable to exchange information in a network environment. These switching elements may include any suitable hardware, software, components, modules, interfaces, or objects that facilitate the operations thereof. This may be inclusive of appropriate algorithms and communication protocols that allow for the effective exchange of data or information.

In example implementations, at least some portions of the activities outlined herein may be implemented in software in, for example, any portion of switching element 100. In some embodiments, one or more of these features may be implemented in hardware, provided external to switching element 100, or consolidated in any appropriate manner to achieve the intended functionality. Switching element 100 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switching element 100 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In one example implementation, a switching element as described in FIGS. 1-7 may include software in order to achieve the functions outlined herein. A switching element as described in FIGS. 1-7 can include memory elements for storing information to be used in achieving the activities, as discussed herein. Additionally, the switching element described in FIGS. 1-7 may include a processor that can execute software or an algorithm to perform operations, as disclosed in this Specification. These devices may further keep information in any suitable memory element [random access memory (RAM), ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction may be described in terms of two, three, or four elements. However, this has been done for purposes of clarity and example only. In certain cases, it may be easier to describe one or more of the functionalities of a given set of flows by only referencing a limited number of elements. It should be appreciated that the switching element described in FIGS. 1-7 (and its teachings) are readily scalable and can accommodate a large number of components, as well as more complicated/sophisticated arrangements and configurations. Accordingly, the examples provided should not limit the scope or inhibit the broad teachings of the switching element described in FIGS. 1-7 as potentially applied to a myriad of other architectures.

It is also important to note that the steps in the preceding flow diagrams illustrate only some of the possible scenarios and patterns that may be executed by, or within, the switching element. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. The switching element provides substantial flexibility in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
   receiving a plurality of data packets at an ingress port of a network element, wherein each data packet of the plurality of data packets belongs to one of a plurality of classes;
   transmitting a first portion of the plurality of data packets from the ingress port to a buffer maintained by an egress port of the network element based on a metering policy, wherein the buffer has four thresholds comprising an ON threshold, a LOW threshold, a HI threshold, and an OFF threshold, and wherein the transmitting further comprises:

responsive to the buffer being below the ON threshold, enabling transmission of classes of the plurality of classes;

responsive to the buffer being above the LOW threshold, enabling and disabling transmission of the plurality of classes of the plurality of data packets according to the metering policy using a plurality of weights;

responsive to the buffer being above the OFF threshold, disabling transmission of classes of the plurality of data packets; and responsive to the buffer being below the HI threshold, enabling and disabling transmission of the plurality of classes of the plurality of data packets according to the metering policy using a plurality of weights;

fetching the first portion of the plurality of data packets from the buffer according to a scheduling policy; and retaining a remaining portion of the plurality of data packets at the ingress port;

wherein the metering policy and the scheduling policy each have a plurality of weights associated with the plurality of classes and wherein a maximum credit for the plurality of classes is larger than a largest weight of the plurality of weights.

2. The method of claim 1, further comprising:
mapping a plurality of pointers to the plurality of data packets; and
placing the plurality of pointers in a plurality of queues, wherein each queue of the plurality of queues is assigned to each class of the plurality of classes.

3. The method of claim 2, further comprising:
communicating the first portion of the plurality of data packets to an exit of the egress port.

4. The method of claim 2, further comprising:
fetching the first portion of the plurality of data packets according to an order of the plurality of pointers in the plurality of queues.

5. The method of claim 1, wherein the plurality of weights is based on a deficit weighted round robin system.

6. The method of claim 1, wherein the plurality of data packets comprise unicast traffic or multicast traffic.

7. The method of claim 6, further comprising: fetching the first portion of the plurality of data packets from the buffer according to a first scheduling policy and a second scheduling policy, wherein the first scheduling policy selects between unicast traffic and multicast traffic, and wherein the second scheduling policy selects among the plurality of classes.

8. A switching element for a network communications system, the switching element comprising:
an egress port;
a buffer coupled to the egress port; and
a memory management unit for controlling operation of the buffer, wherein the switching element is configured to:
receive a plurality of data packets at an ingress port of the switching element, wherein each data packet of the plurality of data packets belongs to one of a plurality of classes;
transmit a first portion of the plurality of data packets from the ingress port to a buffer maintained by an egress port of the network element based on a metering policy, wherein the buffer has four thresholds comprising an ON threshold, a LOW threshold, a HI threshold, and an OFF threshold, and wherein the transmitting further comprises:
responsive to the buffer being below the ON threshold, enabling transmission of classes of the plurality of classes;
responsive to the buffer being above the LOW threshold, enabling and disabling transmission of the plurality of classes of the plurality of data packets according to the metering policy using a plurality of weights;
responsive to the buffer being above the OFF threshold, disabling transmission of classes of the plurality of data packets; and
responsive to the buffer being below the HI threshold, enabling and disabling transmission of the plurality of classes of the plurality of data packets according to the metering policy using a plurality of weights;
fetch the first portion of the plurality of data packets from the buffer according to a scheduling policy; and
retain a remaining portion of the plurality of data packets at the ingress port;
wherein the metering policy and the scheduling policy each have a plurality of weights associated with the plurality of classes and wherein a maximum credit for the plurality of classes is larger than a largest weight of the plurality of weights.

9. The switching element of claim 8, wherein the switching element further configured to:
map a plurality of pointers to the plurality of data packets; and
place the plurality of pointers in a plurality of queues, wherein each queue of the plurality of queues is assigned to each class of the plurality of classes.

10. The switching element of claim 9, wherein the switching element further configured to:
communicate the first portion of the plurality of data packets to an exit of egress port.

11. The switching element of claim 9, wherein the switching element is further configured to:
fetch the first portion of the plurality of data packets according to an order of the plurality of pointers in the plurality of queues.

12. The switching element of claim 8, wherein the plurality of data packets comprise unicast traffic or multicast traffic.

13. The switching element of claim 12, wherein the switching element further configured to:
fetch the first portion of the plurality of data packets from the buffer according to a first scheduling policy and a second scheduling policy, wherein the first scheduling policy selects between unicast traffic and multicast traffic, and wherein the second scheduling policy selects among the plurality of classes.

14. Non-transitory tangible media having encoded thereon logic that includes instructions for execution and when executed by a processor operable to perform operations comprising:
receiving a plurality of data packets at an ingress port of a network element, wherein each data packet of the plurality of data packets belongs to one of a plurality of classes;
transmitting a first portion of the plurality of data packets from the ingress port to a buffer maintained by an egress port of the network element based on a metering policy, wherein the buffer has four thresholds comprising an ON threshold, a LOW threshold, a HI threshold, and an OFF threshold, and wherein the transmitting further comprises:
responsive to the buffer being below the ON threshold, enabling transmission of classes of the plurality of classes;
responsive to the buffer being above the LOW threshold, enabling and disabling transmission of the plurality of classes of the plurality of data packets according to the metering policy using a plurality of weights;

responsive to the buffer being above the OFF threshold, disabling transmission of classes of the plurality of data packets; and responsive to the buffer being below the HI threshold, enabling and disabling transmission of the plurality of classes of the plurality of data packets according to the metering policy using a plurality of weights;

fetching the first portion of the plurality of data packets from the buffer according to a scheduling policy; and retaining a remaining portion of the plurality of data packets at the ingress port;

wherein the metering policy and the scheduling policy each have a plurality of weights associated with the plurality of classes and wherein a maximum credit for the plurality of classes is larger than a largest weight of the plurality of weights.

15. The non-transitory tangible media of claim 14, wherein the operations further comprise:

mapping a plurality of pointers to the plurality of data packets; and placing the plurality of pointers in a plurality of queues, wherein each queue of the plurality of queues is assigned to each class of the plurality of classes.

16. The non-transitory tangible media of claim 15, wherein the operations further comprise:

communicating the first portion of the plurality of data packets to an exit of the egress port.

17. The non-transitory tangible media of claim 15, wherein the operations further comprise:

fetching the first portion of the plurality of data packets according to an order of the plurality of pointers in the plurality of queues.

18. The non-transitory tangible media of claim 16, wherein the metering policy and the scheduling policy each have a plurality of weights associated with the plurality of classes.

19. The non-transitory tangible media of claim 14, wherein the plurality of data packets comprise unicast traffic or multicast traffic.

20. The non-transitory tangible media of claim 19, wherein the operations further comprise: fetching the first portion of the plurality of data packets from the buffer according to a first scheduling policy and a second scheduling policy, wherein the first scheduling policy selects between unicast traffic and multicast traffic, and wherein the second scheduling policy selects among the plurality of classes.

* * * * *